United States Patent [19]

Okada

[11] Patent Number: 5,134,391
[45] Date of Patent: Jul. 28, 1992

[54] SYSTEM FOR PREVENTING THE USE OF AN UNAUTHORIZED EXTERNAL MEMORY

[75] Inventor: Saturo Okada, Kyoto, Japan

[73] Assignee: Nintendo Company Limited, Kyoto, Japan

[21] Appl. No.: 462,397

[22] Filed: Jan. 8, 1990

[30] Foreign Application Priority Data

Jan. 10, 1989 [JP] Japan .................................. 1-4452
Apr. 20, 1989 [JP] Japan ................................ 1-101028

[51] Int. Cl.$^5$ .............................................. G09G 1/02
[52] U.S. Cl. ..................................... 340/799; 340/798; 340/825.31; 340/825.34
[58] Field of Search ...................... 340/825.34, 825.31, 340/799, 798; 273/85 G, 148 B

[56] References Cited

U.S. PATENT DOCUMENTS

| | | | |
|---|---|---|---|
| 4,118,789 | 10/1978 | Casto | 364/900 |
| 4,442,486 | 4/1984 | Mayer | 364/200 |
| 4,454,594 | 6/1984 | Heffron et al. | 364/900 |
| 4,462,076 | 6/1984 | Smith, III | 364/200 |
| 4,670,857 | 6/1987 | Rackman | 364/900 |
| 4,680,731 | 7/1987 | Izumi et al. | 364/900 |
| 4,801,787 | 1/1989 | Suzuki | 340/825.34 |
| 4,849,746 | 7/1989 | Dubner | 340/728 |
| 4,862,156 | 8/1989 | Westberg et al. | |
| 4,865,321 | 9/1989 | Nakagawa et al. | |
| 4,904,851 | 2/1990 | Yukino | 340/825.34 |
| 4,990,903 | 2/1991 | Cheng et al. | 340/731 |

FOREIGN PATENT DOCUMENTS

53-17849 6/1978 Japan .......................... 97/7
2033763 5/1980 United Kingdom .

OTHER PUBLICATIONS

IBM Tech. Disc. Bul. vol. 14, No. 11, Apr. 1972, "Computer Program Protection" E. J. Lengyel et al.

Primary Examiner—Ulysses Weldon
Assistant Examiner—Doom Yue Chow
Attorney, Agent, or Firm—Nixon & Vanderhye

[57] ABSTRACT

A hand-held electronic game machine includes a computer accommodated in a case and a liquid crystal display (LCD) panel provided at an upper portion of a front surface of the case. When an external memory is inserted to a receiving port formed on a rear surface of the case at a portion opposite to the LCD panel, a first character data being set in advance in the computer is compared with a second character data stored in a predetermined area of the external memory. Prior to such comparison, the computer displays the characters represented by the second character data on the LCD panel. If the first and second character data are coincident with each other, the computer can access to the external memory. During the progression of the game in accordance with a game program of the external memory, the game character can be moved by operating a direction designating key provided at the left side in a portion below the LCD panel of the front surface of the case, and the action manner of the game character can be determined by operating an action key provided at the right side in the portion below the LCD panel. A start key and select key are arranged between the direction designating key and the action key.

24 Claims, 12 Drawing Sheets

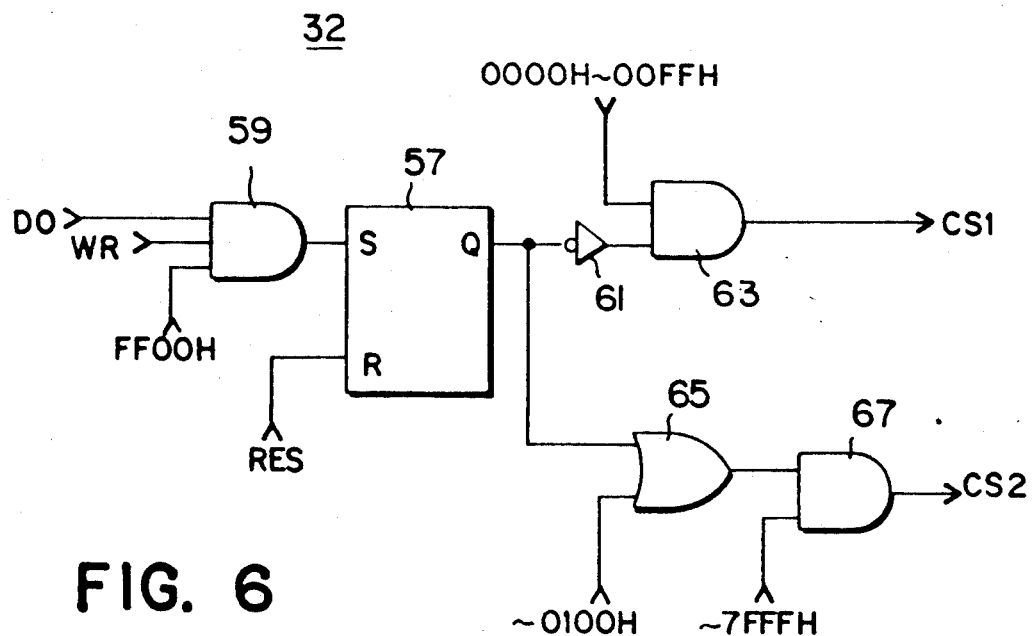
FIG. 6
FIG. 8A
FIG. 8B
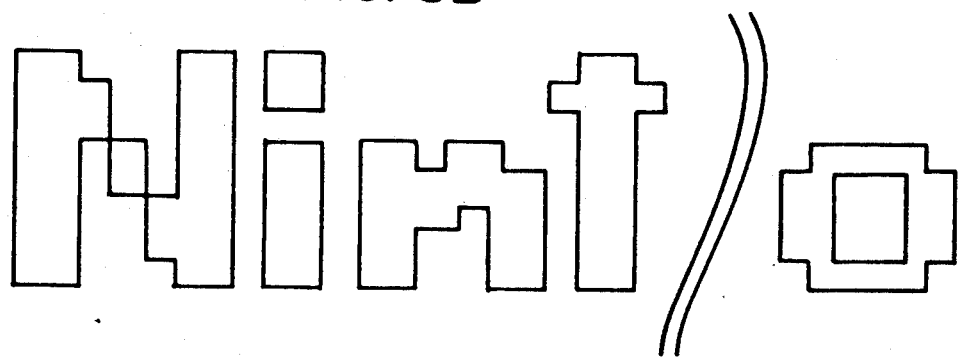

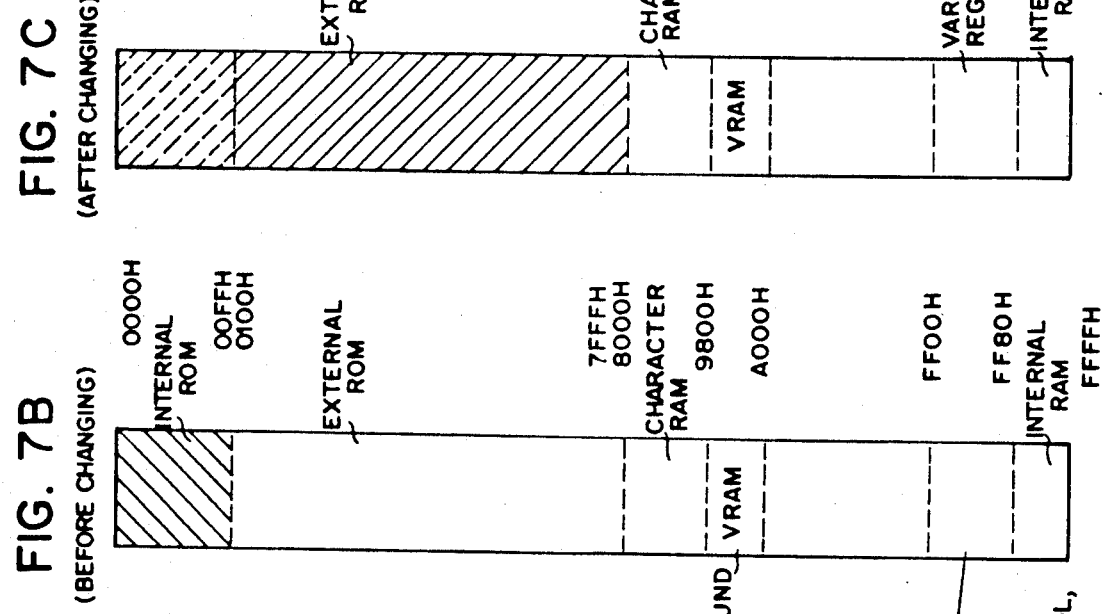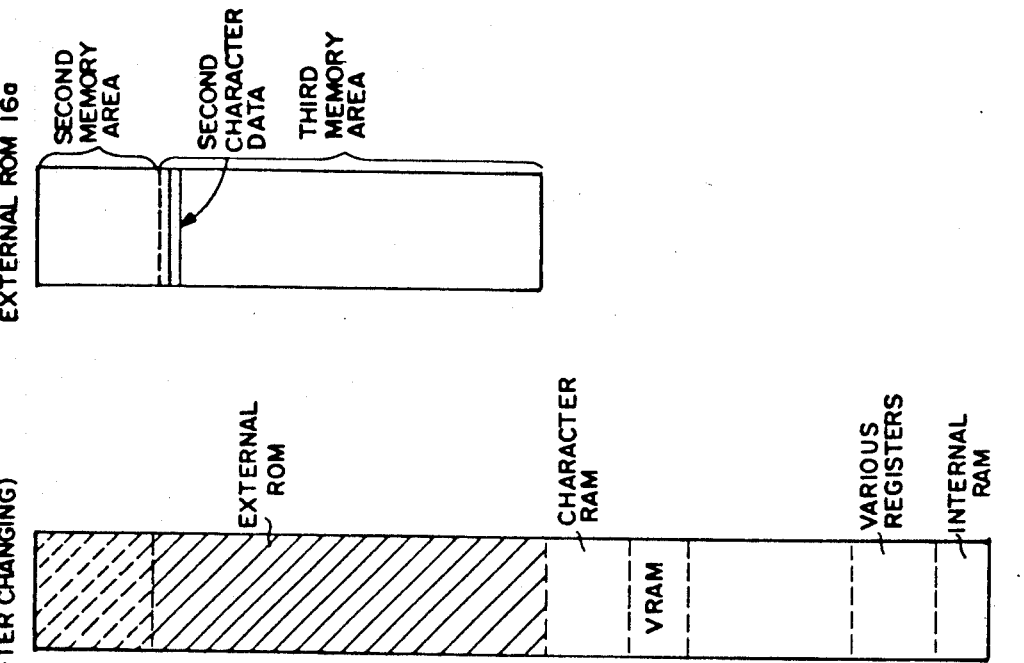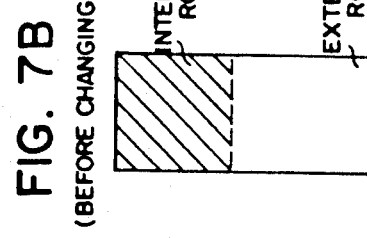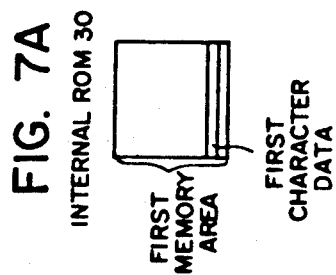

FIG. 12
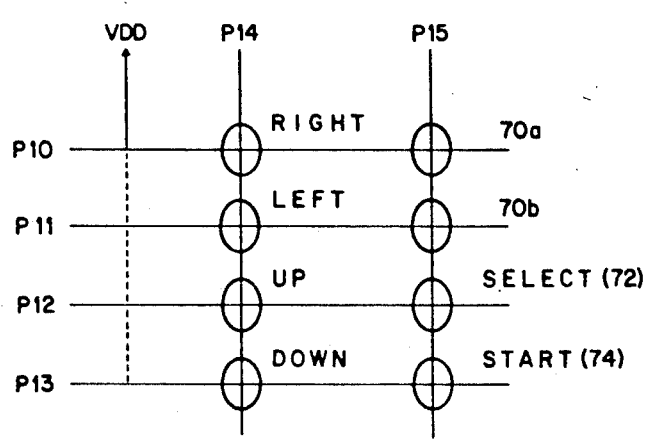
FIG. 14 BACKGROUND (BG) DISPLAY
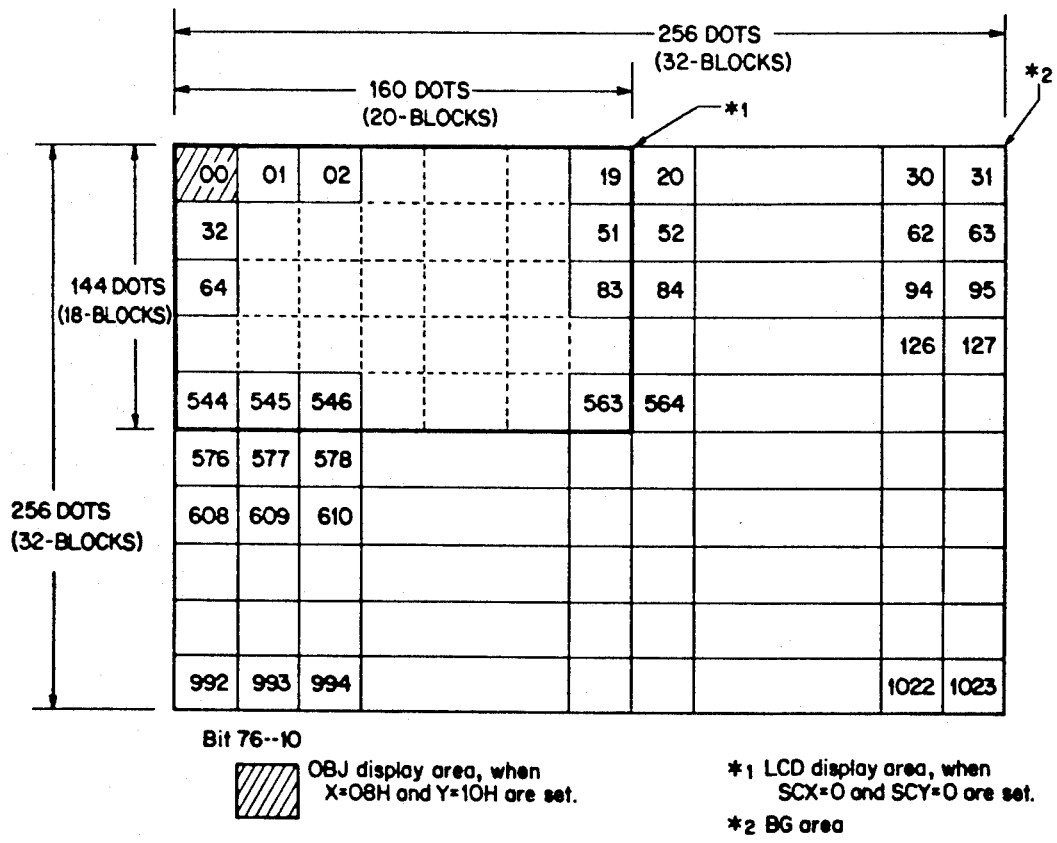
Bit 76–10
▨ OBJ display area, when X=08H and Y=10H are set.
*1 LCD display area, when SCX=0 and SCY=0 are set.
*2 BG area

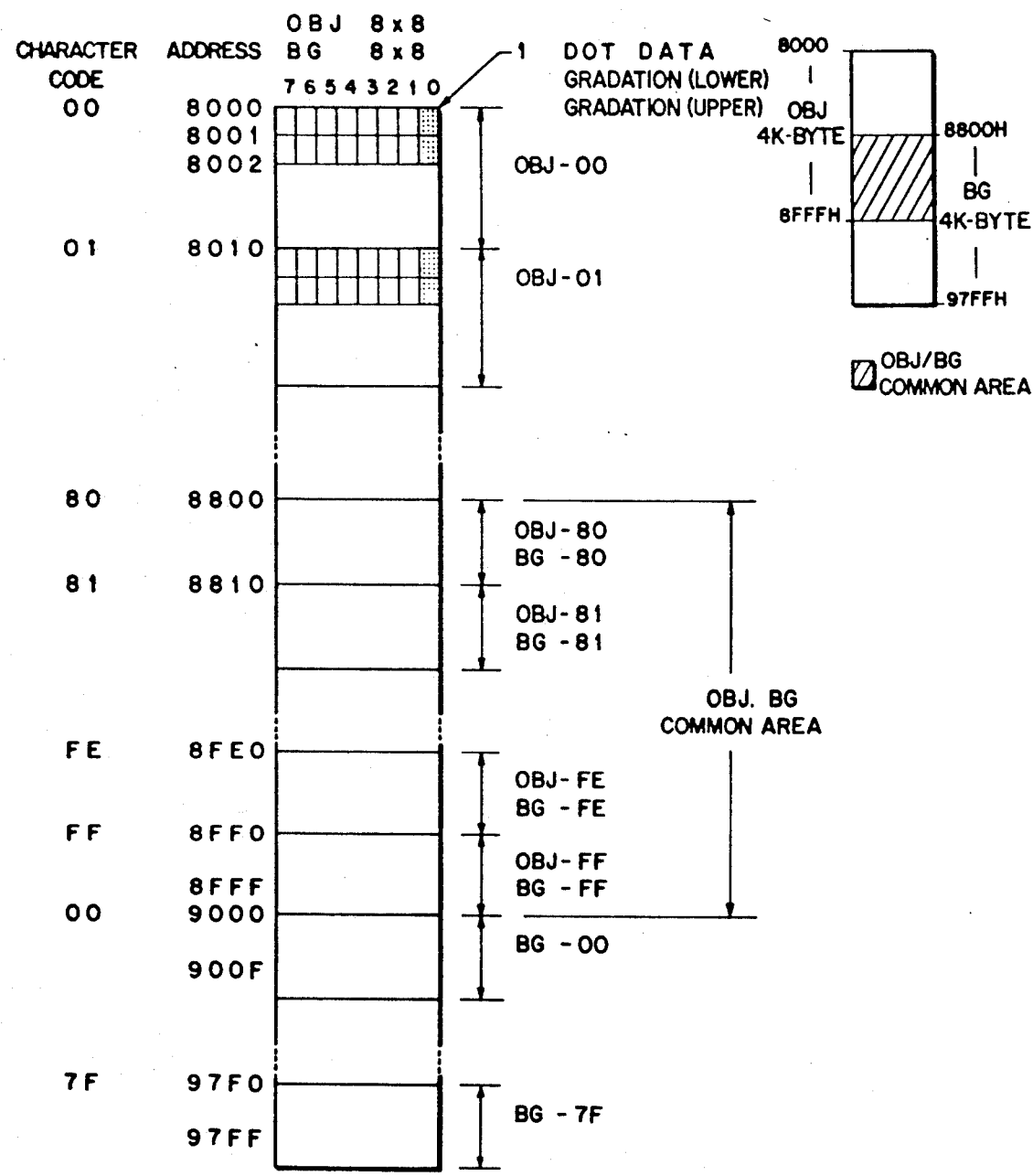
FIG. 13 CHARACTER RAM

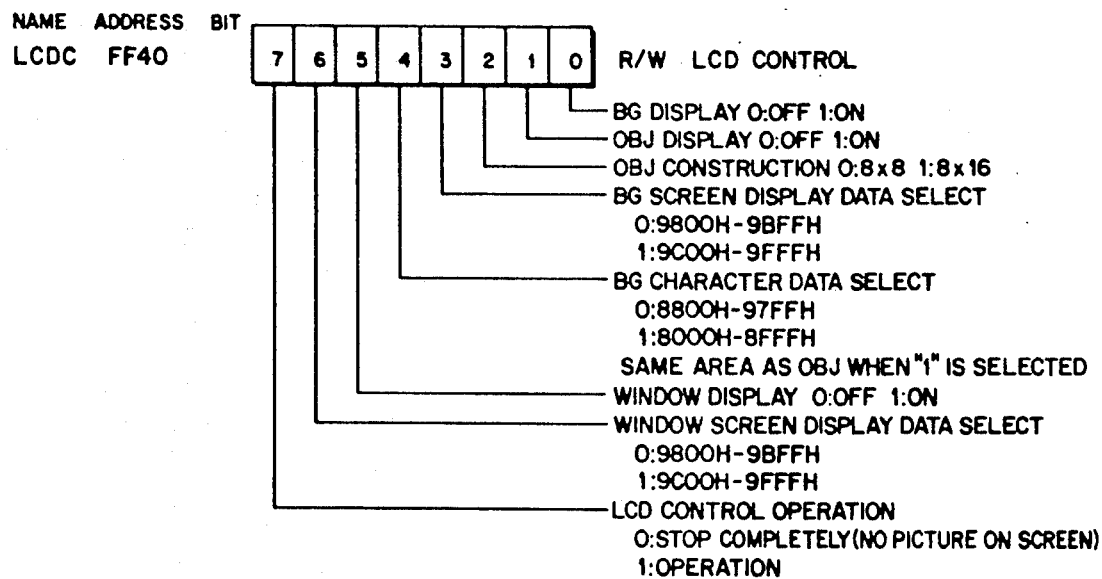
FIG. 15A LCD DISPLAY REGISTER
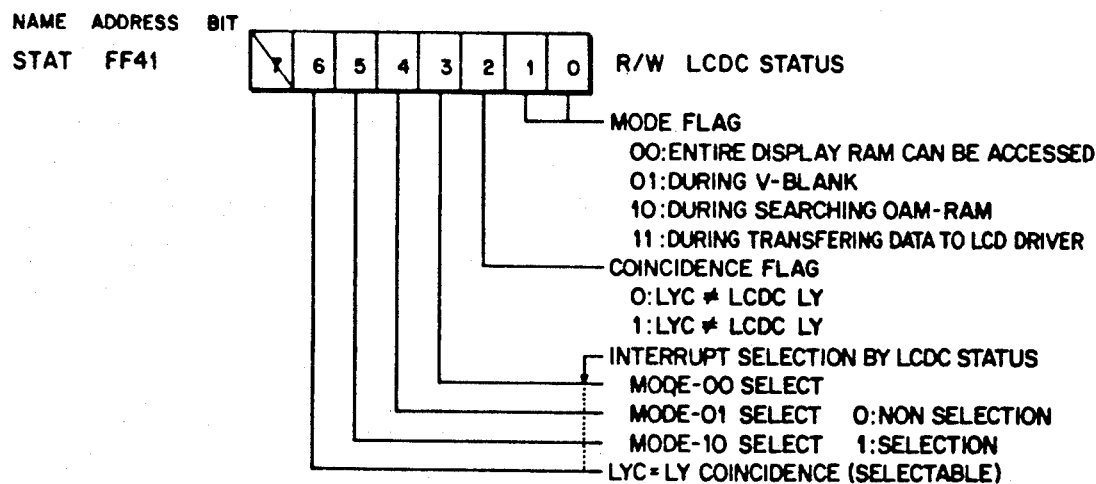
FIG. 15B

FIG. 15C

NAME  ADDRESS  BIT
SCY   FF42    | 7 | 6 | 5 | 4 | 3 | 2 | 1 | 0 |    R/W  SCROLL-Y
                                                       00~FF

FIG. 15D

NAME  ADDRESS  BIT
SCX   FF43    | 7 | 6 | 5 | 4 | 3 | 2 | 1 | 0 |    R/W  SCROLL-X
                                                       00~FF

FIG. 15E

NAME  ADDRESS  BIT
LY    FF44    | 7 | 6 | 5 | 4 | 3 | 2 | 1 | 0 |    R    LCDC Y-COORDINATE

FIG. 15F

NAME  ADDRESS  BIT
LYC   FF45    | 7 | 6 | 5 | 4 | 3 | 2 | 1 | 0 |    R/W  LY COMPARE

FIG. 15G

NAME  ADDRESS  BIT
BGP   FF47    | 7 | 6 | 5 | 4 | 3 | 2 | 1 | 0 |    W   BG PALETTE DATA
                                                       ── DATA FOR DOT DATA-00
                                                       ── DATA FOR DOT DATA-01
                                                       ── DATA FOR DOT DATA-10
                                                       ── DATA FOR DOT DATA-11

FIG. 15H

NAME  ADDRESS  BIT
OBP0  FF48    | 7 | 6 | 5 | 4 | 3 | 2 | 1 | 0 |    W   OBJ PALETTE DATA (0)
                                                       (IN CASE OF OAM PALETTE SELECT FLAG-0)
                                                       ── DATA FOR DOT DATA-00
                                                       ── DATA FOR DOT DATA-01
                                                       ── DATA FOR DOT DATA-10
                                                       ── DATA FOR DOT DATA-11

FIG. 15I
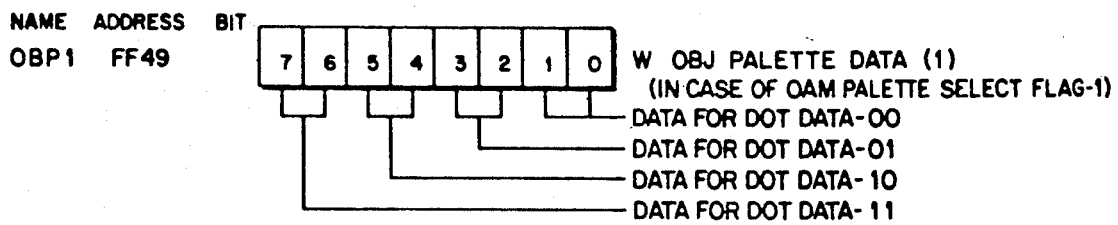
FIG. 15J
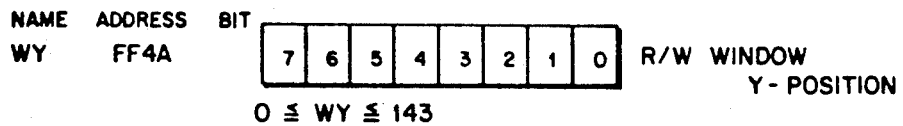
FIG. 15K
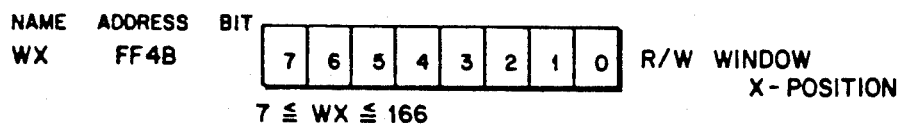
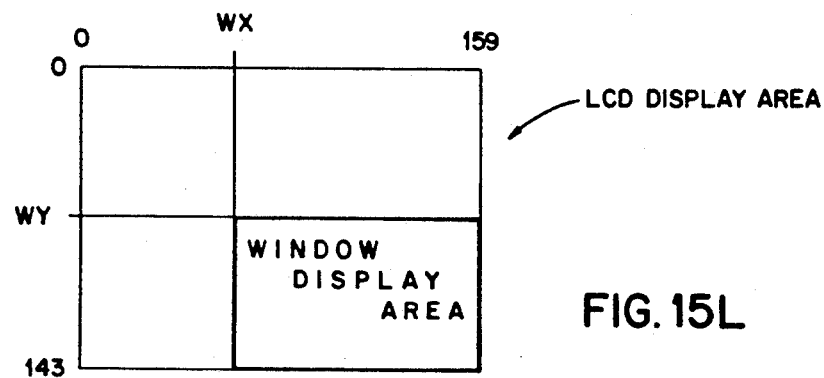
FIG. 15L

SYSTEM FOR PREVENTING THE USE OF AN UNAUTHORIZED EXTERNAL MEMORY

CROSS-REFERENCES TO RELATED APPLICATIONS

The subject application is related to the following copending commonly-assigned U.S. Patent applications filed concurrently herewith:

U.S. Ser. No. 07/462,491 entitled "METHOD AND APPARATUS FOR GENERATING PSEUDO-STEREO SOUND"

U.S. Ser. No. 07/462,400 entitled "COMPACT HAND-HELD VIDEO GAME SYSTEM"; and

FIELD OF THE INVENTION

The present invention generally relates to a system for preventing the use of an unauthorized external memory unit with a predetermined information processing system. More specifically, the present invention relates to a system for preventing an unauthorized, removable external memory unit storing a game program or the like from being used in a unique hand-held videographics information processing system.

BACKGROUND AND SUMMARY OF THE INVENTION

As evidenced by Japanese Utility Model No. 57989/1986 laid-open on Apr. 18, 1986, games using a liquid crystal display are known. In this game, a game cartridge, attachable to a main body, incorporates a game program and an operating system program to be executed by a central processing unit within the body. The main body also includes a liquid crystal display ("LCD") system.

The present invention provides unique method and apparatus for thwarting the use of unauthorized game cartridges in such a system. In this fashion, unauthorized game cartridges which contain copied programs or low quality programs may be precluded from being used in such a system. Additionally, unauthorized low quality game cartridges which may damage the main body over time (e.g., the connectors) are precluded from being used in the system.

Prior methods have heretofore been used for preventing unauthorized or copied programs from being executed by an information processing apparatus. One such system is disclosed in the Japanese Patent Publication No. 17849/1972 published on Oct. 18, 1972. In this system, a first method is disclosed wherein a first password is assigned to a specific information processing system to distinguish it from other information processing systems. The first password is compared with a second password which is assigned to a floppy disk having a program stored therein. The floppy disk is permitted to be used only when both passwords are identical.

A second method is disclosed in U.S. Pat. No. 4,462,076 issued on Jul. 24, 1984. In this method, data indicative of the proprietor of a copyright are respectively stored in a main memory unit and a cartridge memory. Such data is compared and, if there is a match, the proprietor data is simply displayed and thereafter a program stored in the cartridge memory may be executed.

A third method is disclosed in Japanese Patent Publication No. 18074/1984 published on Apr. 25, 1984. In this method, copy preventing information such as a trademark is stored in a plurality of semiconductor memories and, when a printed circuit board in which a program is copied is used, the copy preventing information is displayed on a CRT, thereby subjecting the copier to a possible claim of trademark infringement. Clearly, this third method is not effective where the copier deletes or changes the copy preventing information to thereby avoid any issue regarding the infringement of a trademark right.

The first and second methods are similar to each other in that they both permit the use of a floppy disk or a cartridge on the condition that first and second identifying data are coincident. However, the first method does not expressly teach that the password is displayed. Thus, the first method does not teach displaying information relating to the proprietor of the copyright as done in the second method.

In the second method, in the case where the proprietor data in the main unit memory and the proprietor data in the cartridge memory are not coincident, the cartridge cannot be used. However, since no proprietor data is displayed in this case, an operator or user will not be informed as why the cartridge cannot be used. Furthermore, if the results of the comparison indicate that the proprietor data matches, no further checks are made to insure that the cartridge is authorized.

Therefore, a principal object of the present invention is to provide an authentication system for an external memory unit, in which it is possible to more effectively prevent the use of unauthorized external memory units in a predetermined information processing system, such as a hand-held electronic video game system.

The present invention is directed to a system for preventing the unauthorized use of an external memory unit which is used in an information processing system comprising an external memory unit having an external memory which is attachably/detachably connected to an information processing apparatus capable of displaying a predetermined image on a display means in accordance with a program stored in the external memory when the external memory unit is loaded into the information processing apparatus. The information processing apparatus includes an information processing means capable of accessing a predetermined maximum address space; an internal memory having a first memory area which has a first memory space relatively smaller than the maximum address space and stores first character data for preventing the unauthorized use of the external memory unit and an authenticity determining program data for determining the authenticity of the external memory unit based upon the first character data; and a memory selecting means for changing or selecting one of the internal memory and the external memory. The external memory of the external memory unit includes a second memory area having a memory space corresponding to the first memory space and a third memory area having a relatively larger second memory space. In a portion of the third memory area of the external memory, second character data is stored which has a predetermined relationship with respect to the first character data stored in the internal memory. Additionally, a program for displaying an image in accordance with a predetermined purpose (e.g., an interactive game) is stored in at least the remaining memory area of the third memory area. When the external memory unit is loaded to the information processing apparatus, the memory selecting means sets the first memory space as the address space which the information processing means can access. Thereafter, the information processing means determines whether the first character data and the second character data have the predetermined relationship by executing the authenticity determining program data stored in the internal memory. If the first and second character data have the predetermined relationship, the memory selecting means selects the second memory space as the address space which the information processing means can access to allow the information processing means to have access to the external memory.

As indicated above, when the external memory unit is loaded to the information processing apparatus, the memory selecting means selects the first memory space as the address space which the information processing means can access. Thereafter, prior to any comparison operation, the second character data stored in the external memory is displayed on the display means. The authenticity determining program stored in the internal memory is then executed. At this time, the first and second character data are compared with each other in accordance with the authenticity determining program and, when it is determined that both character data have the predetermined relationship, the memory selecting means selects the external memory as a memory to which the information processing means can have access.

In one embodiment, the information processing apparatus is constructed as a hand-held electronic game machine which is intended to be operated while the machine is sandwiched by the player's hands. Such a hand-held electronic game machine includes a handheld case; a first operation switch disposed at a position where it can be operated by the thumb of the left hand on a front surface of the case; a second operation switch disposed at a position where it can be operated by the thumb of the right hand on the front surface of the case; and a third operation switch provided in a region where an imaginary loci of the thumbs of the left hand and right hand intersect with each other on the front surface of the case.

A direction designating switch (specifically, a cross-key switch) which is utilized for designating a moving direction of a game character is arranged as the above described first operation switch, and an action key (specifically, a push-button switch) for designating one of various kinds of action or motion of the game character. For example, the depression of such a push-button switch may cause a game character to jump, use a weapon, throw a ball or the like. These first and second operation switches are usually operated during the game. The first and second operation switches are arranged at positions where they can be easily operated during game play.

The above-described third operation switch, may, for example, be a start switch for designating the start of the game and/or a select switch for selecting a mode of operation of the game. Such a third operation switch is arranged in a region where the imaginary loci of the thumbs of the both hands intersect each other. Therefore, the third operation switch is disposed to be readily operated by the thumb of either hand. Thus, the third switch may be operated during game play without requiring the user to change the position of the hands during the game.

These and other objects, features, aspects and advantages of the present invention will become more apparent from the following detailed description of the embodiments of the present invention when taken in conjunction with the accompanying drawings.

BRIEF DESCRIPTION OF THE DRAWINGS

FIG. 6 is a circuit diagram showing an exemplary memory selecting circuit such as shown generally in FIG. 5;

FIGS. 7(A) through 7(D) are a memory map showing address spaces to which CPU core can access;

FIGS. 8($A_i$; and 8(B) are illustrative views showing examples of character data to be displayed;

FIG. 12 illustrates a key-matrix for detecting a key or switch input;

FIG. 13 is an exemplary character RAM memory map;

FIG. 14 is an exemplary VRAM memory map; and

FIGS. 15(A) through 15(L) are exemplary embodiments of various addressable registers associated with the LCD controller.

DETAILED DESCRIPTION OF THE DRAWINGS

Figure 1:
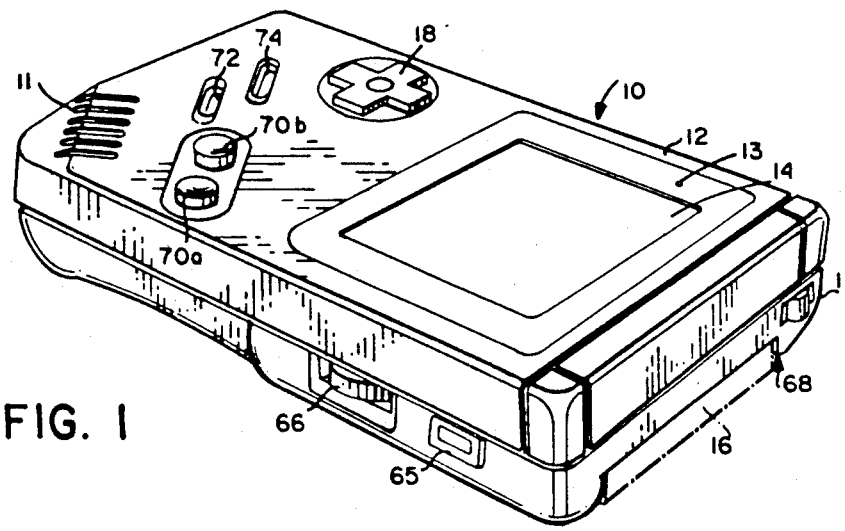
FIG. 1, is a perspective view showing an exemplary exterior housing of a game machine in accordance with an exemplary embodiment of the present invention.

FIG. 1 is a perspective view showing the exterior housing of an exemplary hand-held liquid crystal game machine in accordance with an exemplary embodiment of the present invention. This hand-held liquid crystal game machine (hereinafter referred to as "game machine") 10 includes a case 12 which is provided with an LCD panel 14 including dot display segments being arranged in accordance with a dot-matrix system on a front or upper surface thereof.

Figure 2:
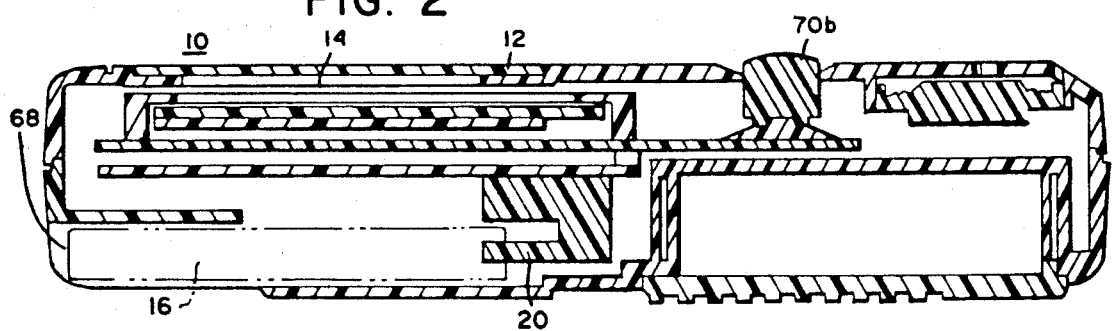
FIG. 2 is an illustrative view showing a cross-section along a line II—II in FIG. 3.

On a rear or lower surface of the case 12, an insertion port 68 (which is more clearly shown FIG. 2) is formed at a portion opposite to the LCD panel 14. An external ROM cartridge 16 is pluggably inserted in the insertion port 68. More specifically, a 32-pin connector 20 is provided in the insertion port 68. By inserting the external ROM cartridge 16 into the insertion port 68, a connector (not shown) formed at an edge of a printed circuit board of the external ROM cartridge 16 is inserted and connected to the connector 20. Thus, the external ROM cartridge 16 can be attachably/detachably connected to the game machine 10. An external ROM 16$a$ (FIG. 5) is incorporated in the external ROM cartridge 16. A game program is stored in the external ROM 16$a$.

When the external ROM cartridge 16 is loaded in the game machine 10, the game program is executed such that an image is displayed on the LCD panel 14 and music for the game is generated at speaker 11 or through ear phones connected at jack 69.

A six-pin connector 65 is also provided in the case 12, whereby the game machine can be linked to other machines by an appropriate cable so that multiple player competition is possible when the external cartridges include multiple-player game programs.

Figure 3:
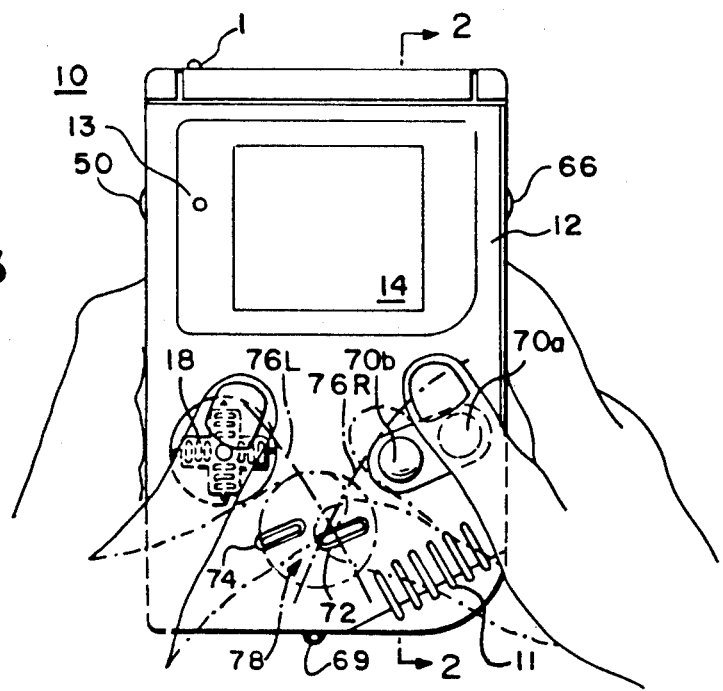
FIG. 3 is an illustrative view showing an arrangement of switches or keys such as a start switch, select switch, and so on in the FIG. 1 embodiment.

A cross-key switch 18, which is used when a game character being displayed on the LCD panel 14 is to be moved, is provided on the front or upper surface of the case 12 at a left side portion below key switch 18 has four direction designating portions and, by depressing any one of the same, it is possible to move the game character upward or downward or leftward or rightward. In addition, as shown in FIGS. 1 and 3, two push-button switches 70a and 70b are provided on the front or upper surface of the case 12 at a right side portion below the LCD panel 14. These push-button switches 70a and 70b are operated when it is necessary to control the game character being displayed on the LCD panel 14 to perform various predetermined actions. For example, when the push-button switch 70a is depressed, the displayed character may appear to jump, or when the push-button switch 70b is depressed, the character may appear to throw a stone, or a ball, or launch various other objects. Thus, the cross-key switch 18 is disposed to be operated by the thumb of the left hand, which sandwiches the case 12 in cooperation with the right hand, and the push-button switches 70a and 70b are disposed to be operated by the thumb of the right hand.

Furthermore, a start switch 72 and a select switch 74 are provided on the front or upper surface of the case 12 of the game machine 10. As seen from FIG. 3, the start switch 72 and the select switch 74 are arranged in a region 78 below the cross-key switch 18 and the push-button switches 70a and 70b. In this region, imaginary loci 76L and 76R of the thumbs of both hands intersect each other. Therefore, these switches 72 and 74 are centrally disposed so as to be operated by the thumbs of any one of the left hand and the right hand (while the left hand and the right hand hold the case 12 of the game machine 10). In other words, the switches 72 and 74 may be operated without significantly changing the positioning of the hands. The select switch 74 is used, for example, to select the mode of operation of the game being displayed through the use of a menu screen. In this regard, the select switch 74 may be used to select one of a number of levels of game play. In addition, a function for selecting a "weapon" usable by a game character can be assigned to the select switch 74.

The start switch 72 is operated to start the game as selected. Therefore, it is not typically necessary to operate the start switch 72 and the select switch 74 during the game. However, since a pause (PAUSE) function is also assigned to the start switch 72, the start switch 72 may be depressed when it is desired for the game to be temporarily stopped. To start the game after such a pause, the start switch 72 must be depressed again. Furthermore, it is possible to make the start switch 72 and the select switch 74 possess many other functions.

The case 12 is additionally provided with on/off switch 1, battery power level light 13, contrast adjustment 50, and volume adjustment 66.

Figure 4:
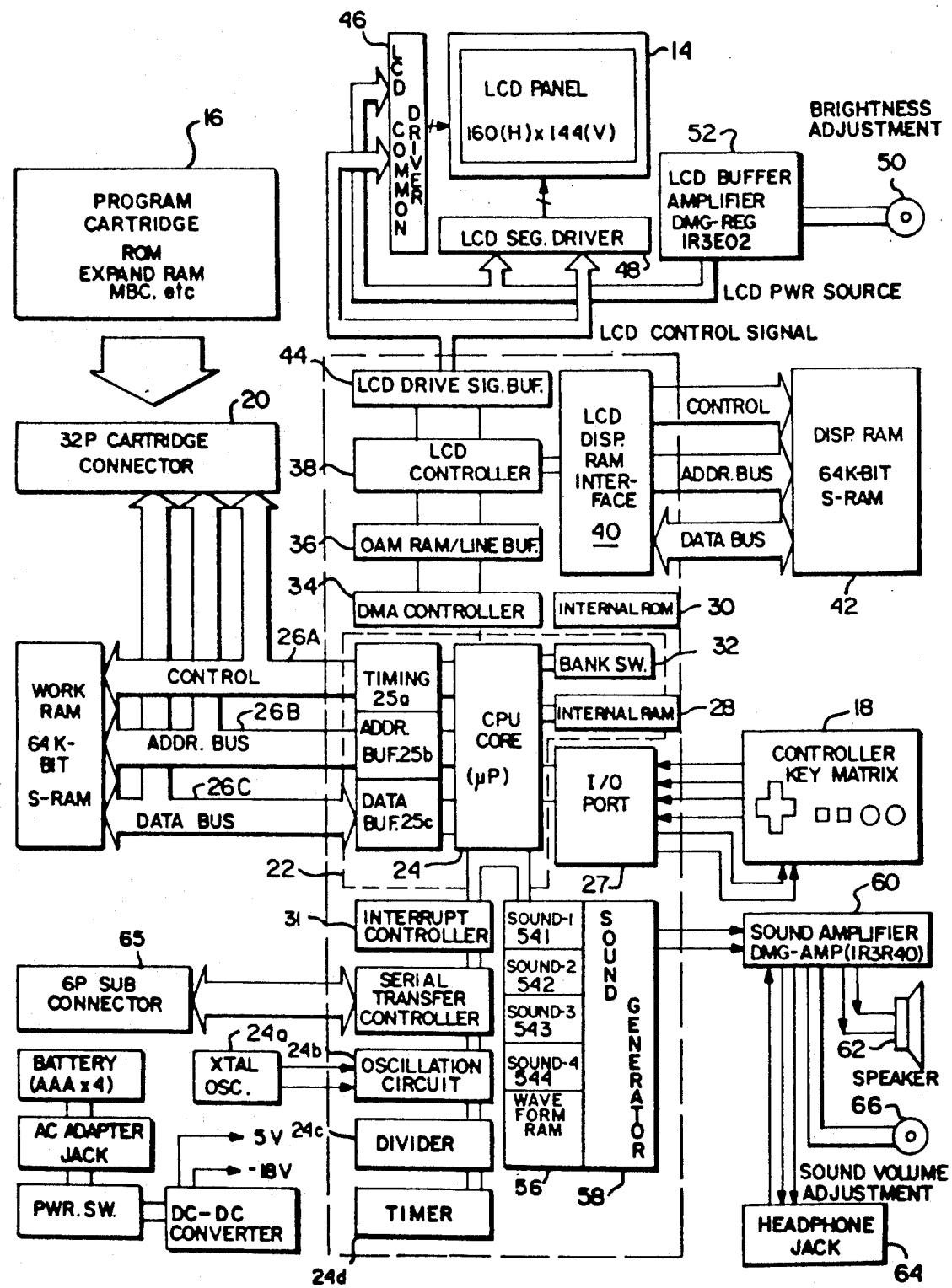
FIG. 4 is a block diagram showing the electronic components of the FIG. 1 embodiment.

With reference to FIG. 4, the above described external ROM cartridge 16 is connected to a CPU 22 housed in the case 12 by a 32-pin connector 20.

The CPU 22 includes a CPU core 24, which may, by way of example only, be implemented with a commercially available microprocessor such as a Z80 The CPU core 24 is connected to the 32-pin connector 20 via timing unit 25a and control bus 26a, address buffer 25b and address bus 26b and data buffer 25c and data bus 26c as well as a working RAM or scratchpad memory 23. Therefore, when the external ROM cartridge 16 is loaded in the game machine 10, the CPU core 24 is connected to the external ROM cartridge 16.

Figure 5:
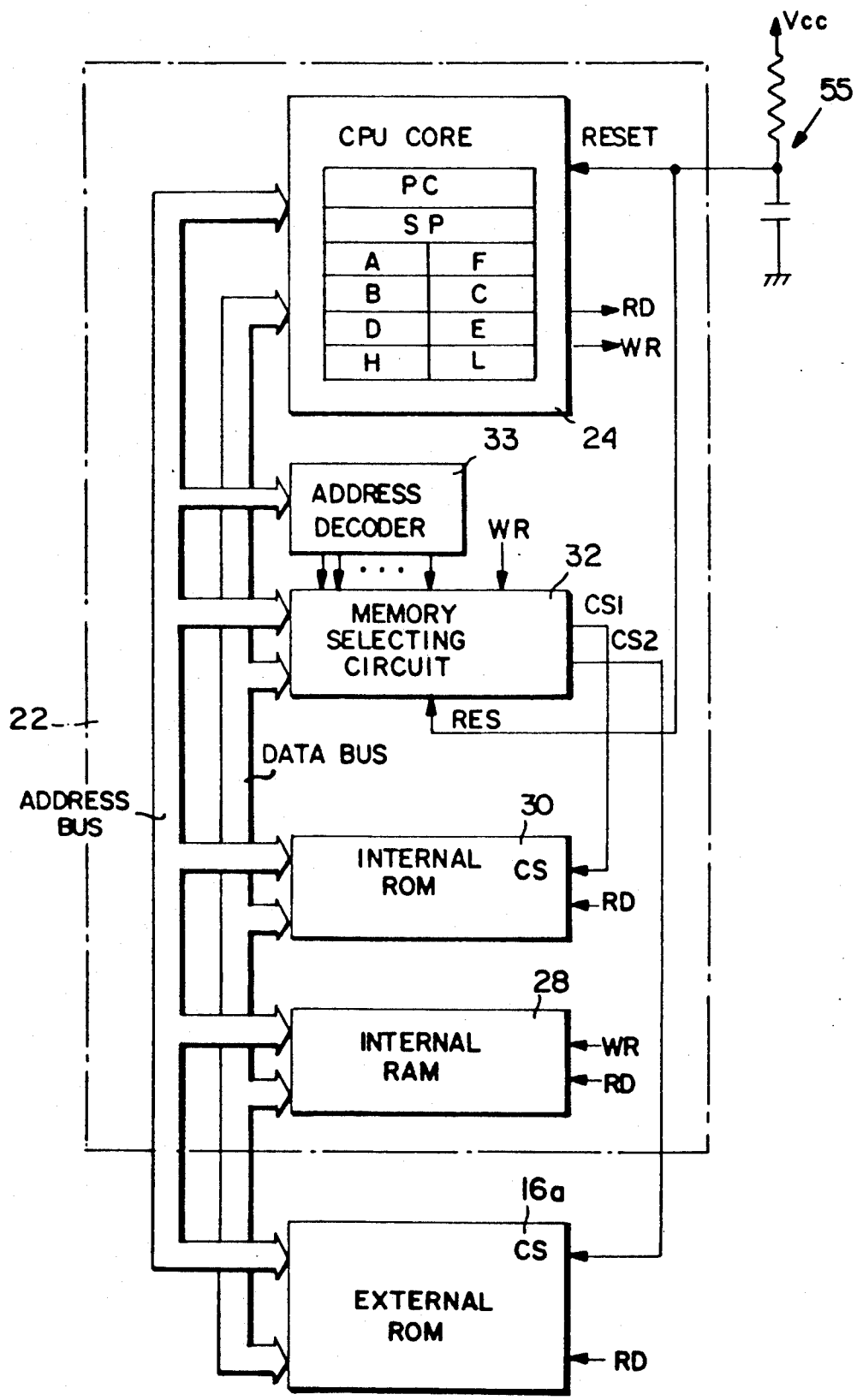
FIG. 5 is a block diagram showing a major portion of FIG. 4 in further detail.

As shown in further detail in FIG. 5, the above described CPU core 24 includes registers A, F, B, C, D, E, H and L each of which is a register of 8 bits, except for program counter PC and stack pointer SP which are 16 bit registers. The register A is an accumulator and the register F is a flag register. By using 4 bits of the 8 bits of the register F, it is possible to indicate F1 (carry), F2 (half carry), F3 (negative), or F4 (zero flag). The registers B and C, D and E, and H and L may be combined and used as a register of 16 bits. The CPU 22 preferably has an associated instruction set permitting a variety of 8 and 16 bit transfers between registers or register pairs, a variety of 8 and/or 16 bit arithmetic operations (e.g., ADD, SUB, AND/OR, INC. DEC, etc.), a variety of rotate/shift operations (e.g., rotate specified register contents left/right), a variety of bit control operations (e.g., setting a specified bit in a specified register), conditional and unconditional branch operations, subroutine call and return operations and a variety of program control operations (e.g., start, stop, no operation, etc.).

Turning back to FIG. 4, a key-matrix for detecting a key input from cross-key switch 18 is connected to the CPU core 24 via a port 27. An exemplary key-matrix is shown in FIG. 12. Lines P10-P13 in FIG. 12 corresponds to the four inputs to port 27 and lines P14 and P15 correspond to the two output lines emanating from port 27. The four inputs P10-P13 are coupled to a predetermined bias voltage Vdd. The presence or absence of a signal on lines P10-P15 is registered in a CPU addressable port register (not shown). As will be readily apparent to those skilled in the art, the state of the port register may be used to determine the control function desired by the game player. In this fashion, the depression of cross-key switch 18 may be detected by the CPU thereby resulting in character motion in the right, left, up or down directions. Also, the depression of control switches 70a, 70b, 72 or 74 may be detected and input to CPU core 24 via port 27 for implementation of the appropriate control functions. Still further depression of the control switches shown in FIG. 12 can be used to cause the transfer of data among game machines by way of 6-pin connector 65, a cable and a conventional serial register transfer port, under control of CPU core 24 serial transfer controller 21, interrupt controller 31, and external ROM cartridge 16. Such transfer of data is for the purpose of providing simultaneous multiple player competition in accordance with particular game programs stored in external cartridge 16.

The CPU core 24 is also coupled to an internal RAM 28 and an internal ROM 30. The internal ROM 30 can be accessed by the CPU core 24 only when the internal ROM 30 is selected by a memory selecting circuit 32 as is explained in detail below. Clock pulses are supplied by oscillator circuit 24b in response to crystal generator 24a. Clock pulse divider 24c provides one or more pulse rates under control of timer 24d.

Figure 9:
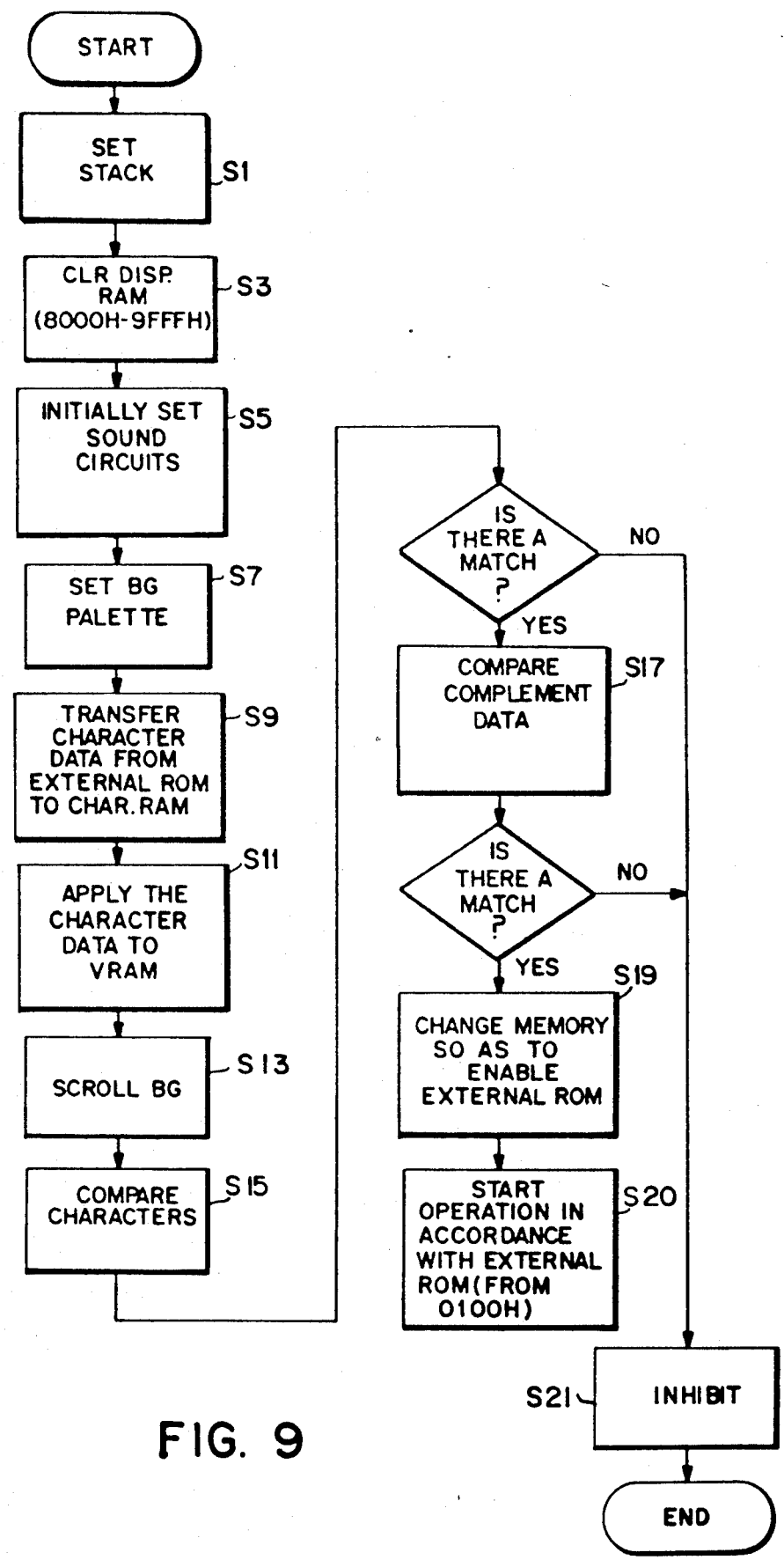
FIG. 9 is a flowchart showing a sequence of authenticating operations controlled by the processing shown in FIG. 4.
Figure 10:
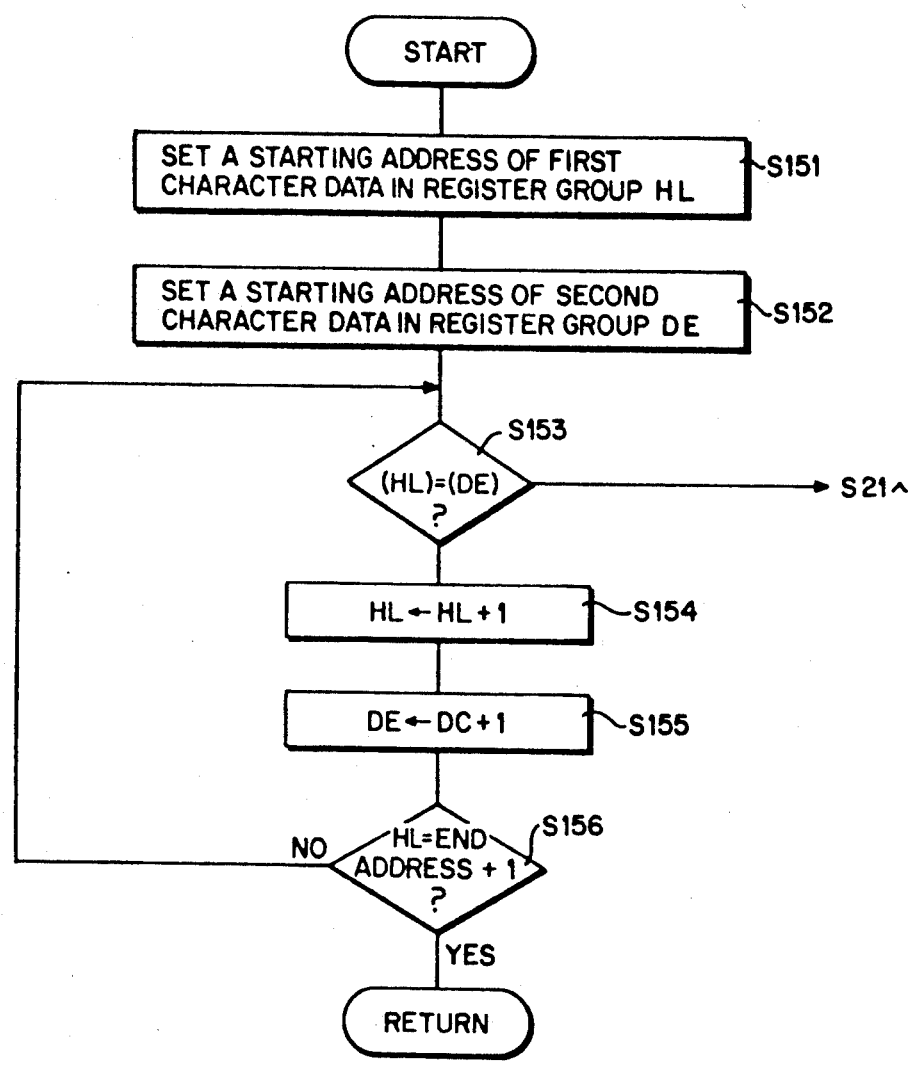
FIG. 10 a flowchart showing a sequence of operations for comparing first character data with second character data.

Now, with reference to FIGS. 7A-7D, an exemplary CPU core address space and the nature of the data stored in internal memory 30 and the external memory cartridge 16 will be described in detail. As shown in FIGS. 7A and 7B, the internal ROM 30 has a first memory area which is designated by the addresses "0000H-00FFH" which corresponds to a first relatively small address space. The "H" indicates that these addresses are represented as a hexadecimal number. In the first memory area, first character data for displaying, for example, a trademark "Nintendo", and an external memory authenticity determining program shown by a flowchart of FIG. 9 are stored.

The external ROM cartridge 16 includes the external ROM 16a. As shown in FIGS. 7C and 7D, the memory space of the external ROM 16a is divided into a second memory area which is designated by the addresses "0000H-00FFH" (which correspond identically to the addresses defining the above-described first address space) and a third memory area (second address space) which is designated by the addresses "0100H-7FFFH". In an authorized external memory cartridge, in a region starting at the address "0100H" in the third memory area, second character data (which is the same as the first character data) is stored. A game program is stored in the remaining region of the third memory area. Preferably, in a few bytes after the second character data storing region, auxiliary data such as a code identifying a manufacturer, the name of the game, the cartridge type, the memory size, etc., are stored. Additionally, complement data relating to the auxiliary data (e.g., the complement of the sum of such data) is also stored. The complement data is used during step S17 described below in conjunction with FIG. 9. In addition, in the case where the required capacity of a game program is large, the second memory area ("0000H-00FFH") of the external ROM 16a may be used to store such a program data for the game.

Returning to FIG. 4, the CPU core 24 outputs display data to an LCD controller 38 via a line buffer 36 under the control of a DMA controller 34. The LCD controller 38 is connected to a display RAM 42 via an LCD display RAM interface 40 and control, address and data busses. Although not shown, the display RAM 42 includes a character RAM and VRAM of the nature generally shown in FIG. 7. Detailed exemplary memory maps of the character RAM and the VRAM memory areas are found FIGS. 13 and 14, respectively. The exemplary map of the VRAM as illustrated in FIG. 14 includes 1024 blocks (32 × 32) of character code representing background display data. Although only 360 (18 × 20) of the 1024 blocks are displayed on the LCD screen at any particular time, the selected area to be displayed can be changed by changing the data in the vertical and horizontal scroll registers (SCY and SCX) of the LCD controller 38.

The LCD controller 38 operates under the control of CPU 22 via various addressable control/status registers which are located in the CPU address space as shown generally in FIG. 7. These registers include an LCD display register, LCD controller status register, horizontal and vertical scroll registers, LCDC vertical line identification register, and moving object and background palette (e.g., 2 bits identifying 1 of 4 gradations of shaded color) data. The LCD display register controls the nature of the display, and the status register indicates the current status of the LCD controller. Every dot of the background display data is available by changing the data of the horizontal vertical scroll registers. The LY and LYC registers indicate and control the vertical line of the display to which data is presently being transferred by way of the display drivers. The X and Y window position registers control that portion or window of the LCD display area in which the OBJ character as well as the BG character data appears. Further details regarding these registers and their functions may be found in FIGS. 15(A) through 15(L).

The LCD control 38 converts display related data output from the CPU core 24 into an LCD drive signal which is output from the display RAM 42. More specifically, the display data from the CPU core 24 designates addresses of the character RAM and the VRAM (video RAM) such that a character (or object) signal and a background signal are output from the character RAM and the VRAM. Respective LDC drive signals are composed by the LCD controller 38.

The LCD drive signals are applied to an LCD common driver 46 and an LCD segment driver 48 through an LCD drive signal buffer 44. Therefore, by means of the LCD common driver 46 and the LCD segment driver 48, an image in accordance with the display related data from the CPU core 24 can be displayed on the LCD panel 14. More specifically, the LCD panel may, for example, define a 144 × 160 matrix of pixels or dots, each having a corresponding unique "intersecting" common electrode/segment electrode combination. The LCD common driver 46, which drives the lines connected to the common electrodes, may for example, be a Sharp LH 5076 F. The LCD segment driver 48, may for example be a Sharp LH 5077 F. These display drivers receive data from the LCD drive signal buffer 44, which receives data indirectly from the CPU via the display RAM 42, the LCD RAM interface 40 and the LCD controller 38.

In addition, there is an intensity level control 50 which is connected to an LCD buffer amplifier 52 such that the intensity of the LCD panel 14 can be adjusted by operating the intensity level control.

In addition, as shown in FIG. 5, a chip select signal CS1 or CS2 is output from the memory selecting circuit 32. A reset signal from a reset circuit 55 is applied to the CPU core 24 and the memory selecting circuit 32. The reset signal is output when a power switch (not shown) of the game machine 10 is turned on, and therefore, the CPU core 24 and the memory selecting circuit 32 are initially reset at that time. Then, a read signal RD and write signal WR are output from the CPU core 24, which are suitably input to the external ROM cartridge 16, internal RAM 28, internal ROM 30 and the memory selecting circuit 32. In addition, as will be described further below an address decode signal is given to the memory selecting circuit 32 via an address decoder 33.

As shown in FIG. 6, the memory selecting circuit 32 includes an RS flip-flop 57. A set input S of the RS flip-flop 57 receives an output of an AND gate 59 which receives three inputs including a signal DO, the write signal WR and a detecting signal, i.e., indicated the decoding of the address data "FF00H". The signal DO is the least significant bit of the data is stored in location "FF00H". The decoded signal of the address data "FF00H" is output from the address decoder 33 when an output of an AND gate (not shown) which detects that all bits A0-A7 of the address data are "0", that is, the least significant two digits in the hexadecimal representation are "00" and an output of an AND gate (not shown) which detects that all bits A8-A15 of the address data are "1", that is, the most significant two digits in the hexadecimal representation are "FF" are both output. The reset input R of the RS flip-flop 57 is coupled to the reset signal RES from the reset circuit 55 (FIG. 4). Then, the non-inverted output Q of the RS flip-flop 57 is applied to one input of an AND gate 63 through an inverter 61 and to one input of an OR gate 65. A decoded signal indicating address data "0000H"-00FFH" is applied to the other input of the AND gate 63. A decoded signal which corresponds to the few bytes (wherein the second character data is stored) starting at the address data "0100H" is applied to the other input of the OR gate 65. The decoded signal of the address data "0000H-00FFH" is the inversion of the bits A8-A15 of the address data being OR'ed. The decoded signal of the addresses from the address data "0100H" to the address corresponding to the number of bytes storing the second character data is the bits A8-A14 of the address data which are OR'ed. Then, an output of the OR gate 65 is used as an input to an AND gate 67 together with a decoded signal of the address "-7FFFH" which is the inversion of the bit A15 of the address data. The outputs of the two AND gates 63 and 67 become the aforementioned chip select signals CS1 and CS2, respectively.

In operation, when the power switch (not shown) is turned on, the reset signal is output from the reset circuit 55 and therefore, the RS flip-flop 57 is reset. Therefore, the non-inverted output Q becomes "0". At this time, if the address data from the CPU core 24 is before "00FFH", the chip select signal CS1 is output from the AND gate 63. The chip select signal CS2 from the AND gate 67 is output as "1" when the address data is "0100H" or greater but not above "7FFFH". Therefore, in the state where the chip select signal CS1 is output, the memory space which is represented by oblique lines rising rightward in FIG. 7(B) may be accessed by the CPU core 24 and thus it becomes possible to read the first character data from the internal ROM 30. When the chip select signal CS2 is output, a memory space which is represented by oblique lines lowering rightward in FIG. 7(C) may be accessed by the CPU core 24 and thus it is possible to read the second character data which is stored after the address "0100H" in the external ROM cartridge 16.

On the other hand, in the case of memory changing or selecting, if the write signal WR is output from the CPU core 24 and "1" is stored in the data bit D0 in the address FF00H", the output from the AND gate 59 becomes "1" and thus RS flip-flop 57 is set. Therefore, the non-inverted output Q becomes "1", AND gate 63 is disabled, if the address data exceeds "00FFH"and if so the chip select signal CS1 becomes "0" and the chip select signal CS2 from the AND gate 67 becomes "1". However, if the address data exceeds "8000H", the chip select signal CS2 becomes "0". Therefore, at times before or after the memory chips are changed or selected by the memory selecting circuit 32, the memory for the CPU core 24 is constructed as shown by the oblique lines in FIG. 7. That is, when the chip select signal CS2 is output, it is possible to execute the program data stored in the addresses "0100H"-7FFFH" of the external ROM cartridges 16.

In addition, the character RAM, VRAM, various control and status registers and internal RAM, are always accessible to the CPU core 24 since the chip select signals CS1 and CS2 are not required to access these location.

Next, with reference to FIG. 8-11, the operation of the external memory unit authentication technique in accordance with an exemplary embodiment of the present invention will be described.

As reflected by steps S1, S3, S5, and S7 of FIG. 9, the system is initialized. More specifically, in the step S1, a predetermined value is set in the stack pointer register SP (FIG. 5) of the CPU core 24 and, in the step S3, the memory area designated by the addresses "8000H-9FFFH", that is, the display RAM 42 is cleared. Then, in the step S5, the various registers utilized by sound circuits 541-544, 56, 58, 60, 62, 64 and 66 are initially set. These registers are described in the applicant's copending application Ser. No. 07/462,491, and entitled "Method and Apparatus for Generating Pseudo Stereo Sound", which application is hereby expressly incorporated by reference herein. Additionally, in step S7, BG (background) pallet data is loaded in a pallet register (not shown) included in the LCD controller 38 by the CPU core in accordance with program data stored in the internal ROM 30. The pallet data defines 2 bits of gradation data to be associated with the character data to enable 4 different gradations of shaded color data to be output to the LCD.

In the following step S9, when the address data "0100H —" is output by the CPU core 24 in accordance with the program data stored in the internal ROM 30, the chip select signal CS2 is output by the above described memory selecting circuit 32. In response thereto, the second character data is read from the external ROM cartridge 16 and is transferred to the character RAM area included in the display RAM 42. At this time, preferably, in order to create a display which can be easily seen with fewer character data, the second character data is transferred while being processed to enlarge the character, for example, twice in length and breadth on the LCD panel 14. Then, in order to display a desired character at a predetermined coordinate position, in step S11 the character code of the desired character is applied to the VRAM area of the display RAM 42 such that the display position thereof corresponds to a predetermined position in the VRAM. Then, in the step S13, the second character read from the external ROM cartridge 16 is displayed on the LCD panel 14 for a predetermined time period while the same is scrolled. For example, the character "Nintendo" representative of the registered trademark as shown in FIG. 8(A) can be enlarged twice in length and breadth and displayed as shown in FIG. 8(B). Since such an enlargement process is readily implemented by controlling the character RAM, a detailed description thereof will be omitted here. Although enlargement processing is preferred, if desired the character data as shown in FIG. 8(A) may be displayed as it is without enlargement processing.

Next, in the step S15, after the character data has been displayed the first character data "Nintendo" which is stored int eh predetermined area of the internal ROM 30 and the second character data "Nintendo" are compared with each other. More specifically, in the step S151 of FIG. 10, the starting address of the first character data of the internal ROM 30 is set in the register group HL of the CPU core 24. In step S152, the starting address of the second character data of the external ROM cartridge 16 is set in the register group DE of the CPU core 24. Then, as shown in the step S153, it is determined whether the character data which are designated by the address data loaded in the two register groups HL and DE are wholly or completely coincident with each other or not. If the both character data are coincident with each other, in the steps S154 and S155, the address data in respective register groups HL and DE are incremented and thereafter, the same comparison operation is repeated until the value of the register group HL becomes "the end address +1" in the step S156. Then, if there is not a match, an inhibiting process in the step S21 is entered.

When the comparison of the first and second character data in the step S15 is terminated, as previously noted, a checking operation is executed in step S17 based upon the complement data of the auxiliary data stored in external ROM 16a, such as the ROM size or the like, the code of a manufacturer, the name of the game, the nature of the cartridge memory (ROM only, or ROM plus RAM), et cetera. In this regard, all the auxiliary data may, for example, be summed, and the complement of such a sum computed and stored as a complement number. Then, if the comparison between calculated complement number and the stored complement number results in a mismatch, the inhibiting process of the step S21 is entered.

In the case where the first and second character data become coincident with each other and the complement data are also coincident in the comparison processes in the step S15 and S17, the CPU core 24 in step S19 outputs the write signal WR. In response, as previously described with reference to FIG. 6 and FIG. 7, the RS flip-flop 57 of the memory selecting circuit 32 is set and thus the chip select signal CS2 is output. Therefore, after step S19, the game program data stored in the addresses "0100H-8000H" of the external ROM cartridge 16 can be read and executed. Thereafter, the internal ROM 30 is not selected and, therefore, it is not possible to access the same by way of CPU core 24.

In the following step 20, a game processing operation in accordance with the program data of the external ROM 16a is started. More specifically, the CPU core 24, in accordance with the program data stored in the third memory area of the external ROM 16a, transfers a background character data (dot data) to the character RAM area included in the display RAM 42. At the same time, the BG pallet data and the character code, which designates the background character to be displayed and its display position on the LCD panel 14, are transferred to the VRAM area. Furthermore, the CPU core 24 reads the character codes of the object character to be displayed on a single screen, the display coordinate data and the attribute data form the third memory area of the external ROM 16a and applies them to the LCD controller 38 through the DMA controller 34 and the line buffer 36. In response thereto, the LCD controller 38 executes a process for displaying the image in which the background character and object characters are combined with each other on the LCD panel 14. More specifically, the composite data in which the character data of the objects of one line and the background character data stored in the VRAM area are combined and are temporarily stored in the LCD drive signal buffer 44 by the LCD controller 38. Then the LCD controller 387 sequentially applies the dot data to the drivers corresponding to the dot positions in a direction of line, i.e., row selecting data to the LCD segment driver 48 and the data for sequentially selecting the columns of the respective lines to the LCD common driver 46. The dots where both the row and column are selected are driven for a short time period. In other words, data representative of whether or not the respective dots of the object characters and the background character are to be driven to display are applied to the LCD segment driver 48 and the common driver 46 by the LCD controller 38, whereby the composite image can be displayed on the LCD panel 14. By repeating such operations in a high speed, sequential manner, the driven dots are "displayed" by the density or contrast being different from that of other dots. Moreover, in accordance with a selected combination of driven dots, an arbitrary character can be displayed on the LCD panel 14.

Figure 11:
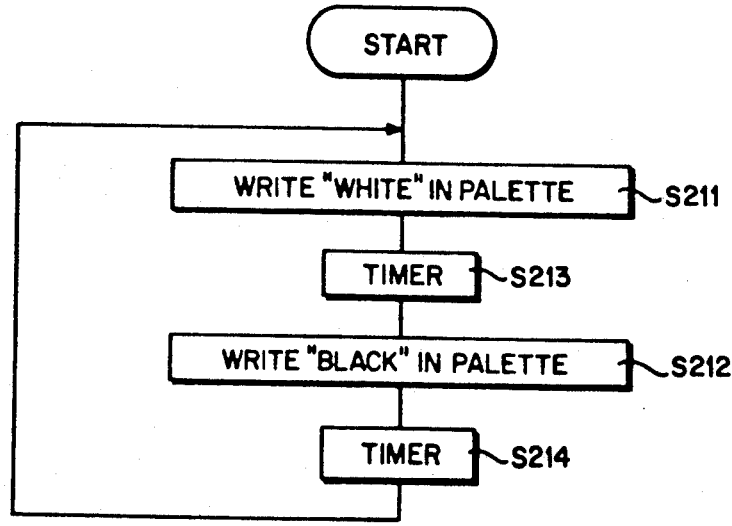
FIG. 11 is a flowchart showing a sequence of operations in an inhibiting process when a first character data and a second character data are inconsistent with each other.

In addition, preferably, if inconsistency is detected in either one of the two comparison steps S15 and S17, the CPU core 24 executes the inhibiting process of the step S21. More specifically, as shown in FIG. 11, in the steps S211 and S212, the CPU 24 writes "white" and "black" in the BG palette, and the LCD panel 14 is driven for a predetermined time period that is controlled by a timer as indicated by steps S213 and S214. In other words, in this embodiment, if the first and second character data are not coincident with each other, the LCD panel 14 is wholly turned on or off or flashed, whereby the operator or user is notified that the external ROM cartridge which is loaded at that time is not an authorized one.

At this time, since the second character data of the external ROM 16a in the external ROM cartridge 16 has been displayed in the previous step S9, the operator or user will know the reason is that the external ROM cartridge is an unauthorized cartridge.

In addition, as seen from FIG. 11, the inhibiting process routine cannot return to the main routine of FIG. 9, the memory bank changing step done in the step S19 is inhibited thereafter, and thus, the unauthorized external ROM cartridge can not be used.

In addition, in the above described embodiment, a trademark such as "Nintendo" is displayed as the second character data. In the case of an external ROM cartridge which is copied such that the both character data are coincident with each other, the manufacturer's trademark will have been used in an unauthorized manner.

In addition, in the above described embodiment, it was determined whether or not the first and second character data is wholly coincident with each other. However, alternatively, a check need only be made to determine whether the first and second character data have a predetermined relationship.

Furthermore, in the inhibiting process routine as shown in FIG. 11, as described the flashing of the LCD panel is repeated. However, if desired, a sentence warning that the external ROM cartridge being attached at that time cannot be used in this game machine may be displayed.

While the invention has been described in connection with what is presently considered to be the most practical and preferred embodiment, it is to be understood that the invention is not to be limited to the disclosed embodiment but on the and equivalent arrangements included within the spirit and scope of the appended claims.

What is claimed is:

1. An authentication system for preventing an unauthorized external memory unit from being used in an information processing system which utilizes a removable external memory unit, said information processing system being capable of displaying a predetermined image by a display means in accordance with a program stored in said external memory unit when the external memory unit is attached thereto, said authentication system comprising:

a central processing unit in said information processing system capable of accessing a predetermined maximum address space, an internal memory coupled to said central processing unit having a first memory area corresponding to a first memory space, relatively smaller than said maximum address space, for storing first character data and an authenticity determining program for determining the authenticity of said external memory unit based upon said first character data, and a memory selecting circuit coupled to said internal memory, said central processing unit, and coupled in use to said external memory unit for selecting any one of said internal memory and said external memory unit;

said external memory unit being coupled in use to said central processing unit and said memory selecting circuit and having an external memory including a second memory area having a memory space corresponding to said first memory space and a third memory area having a relatively larger second memory space;

said external memory including means for storing second character data having a predetermined relationship with respect to said first character data stored in said internal memory, said second character data being stored in a portion of said third memory area of said external memory, said program stored in said external memory unit for controlling the display of predetermined images and being stored in at least the remaining memory area of said third memory area of said external memory;

said memory selecting circuit including a first means, responsive to predetermined memory access related signals received from said central processing unit, for selecting said first memory space such that said central processing unit can access said internal memory and a second means for selecting said second memory space such that said central processing unit can access said external memory when the said external memory unit is loaded into said information processing system;

said central processing unit including means for executing said authenticity determining program for determining whether said first character data which is read from said internal memory and said second character data which is read from said third memory area of said external memory have a predetermined relationship based upon said authenticity determining program stored in said internal memory and for generating an authenticating indicating signal if said predetermined relationship exists;

wherein said central processing unit includes a display controlling means for controlling the display of said second character data stored in said external memory prior to determining whether said first character data and said second character data have said predetermined relationship, and wherein said memory selecting circuit is responsive to said authenticity indicating signal for selecting said second memory space, whereby said central processing unit can access said program stored in said external memory when said first character data and said second character data have said predetermined relationship.

2. A system in accordance with claim 1, said display controlling means including enlargement processing means for displaying said second character data in an enlarged fashion.

3. A system in accordance with claim 1, wherein said display controlling means includes scrolling means for scrolling said second character data on said display means.

4. A system in accordance with claim 1, wherein said first character data and said second character data are identical, and wherein if said central processing unit determines that said first character data and said second character data do not have said predetermined relationship, said central processing unit inhibits said memory selecting circuit from selecting said second memory space such that said central processing unit cannot access said external memory.

5. A system in accordance with claim 1, wherein said information processing system is a hand-held video game system.

6. A system for preventing an unauthorized external memory unit from being used in an information processing system including an external memory unit being attachable or detachable to or from said information processing system, said information processing system being capable of displaying a predetermined image in accordance with a program stored in the external memory unit when the external memory is attached thereto, comprising:

said information processing system including central processing means for executing program instructions and internal memory means for storing first character data;

said external memory unit including external memory means for storing second character data;

memory bank selecting means for enabling access by said central processing means to one of said external memory unit and said internal memory means, said memory bank selecting means including first means for enabling access to said first character data stored in said internal memory means, and second means for enabling access to said second character data stored in said external memory unit;

determining means for determining whether said first character data and said second character data have a predetermined relationship;

display means for displaying an image;

means for controlling said display means to display character data in accordance with the second character data stored in said external memory unit prior to said determining means determining whether said predetermined relationship exists;

said memory bank selecting means including third means for allowing said central processing means access to said external memory unit when it is determined that said first character data and said second character data have said predetermined relationship; and inhibiting means for inhibiting said central processing means from accessing said external memory unit when it is determined that said first character data and said second character data do not have said predetermined relationship.

7. A system for preventing an unauthorized external memory unit from being used in a game machine which utilizes a removable external memory unit including external memory means for storing a game program, said system comprising:

- main game processing means for executing said game program;
- internal memory means coupled to said main game processing means for storing first character data and an authenticating program;
- said removable external memory unit including external memory means for storing said game program, second character data, auxiliary data, and a predetermined value which has a predetermined mathematical relation to said auxiliary data;
- a display means for displaying an image;
- said main game processing means including:
- a memory select circuit for enabling one of said external memory means and said internal memory means,
- first means for comparing said first character data with said second character data and for generating a first signal if a predetermined relationship exists between said first character data and said second character data;
- means for controlling said display means to display said second character data prior to said first means for comparing determining whether said predetermined relationship exists;
- means responsive to said first signal for performing a predetermined calculation using said auxiliary data; and
- second means for comparing the results of said predetermined calculation with said predetermined value;
- wherein said memory select circuit includes means for enabling said game program to be executed when said first signal is generated and if the results of said predetermined calculation has a predetermined relationship with said predetermined value.

8. A system according to claim 7, further including means for vertically scrolling said second character data across said display means.

9. A system according to claim 7, further including means for processing said second character data to permit an enlarged display of said second character data.

10. A system according to claim 7, further including means for transferring said second character data from said external memory means to a character memory means, means for processing said second character data, means for writing said processed second character data to a video memory means; and means for displaying said processed second character data.

11. A system according to claim 7, wherein said means for enabling includes memory bank switching means responsive to said second means for comparing to operatively couple said main game processing means to said external memory unit.

12. A system according to claim 7, wherein said predetermined calculation involves taking the complement of the sum of at least a portion of said auxiliary data.

13. A system according to claim 7, wherein said auxiliary data includes data indicative of the manufacturer and the name of the game.

14. A system according to claim 7, wherein said auxiliary data includes data indicative of the cartridge type and the memory characteristics.

15. A system according to claim 7, wherein said first means for comparing includes; means for setting the starting addresses of the first character data and the second character data in registers associated with said main game processing means and means for incrementing said addresses.

16. A method for preventing an unauthorized external memory unit from being used in a hand-held game machine having a game processing means for executing a game program and a removable external memory unit having an external memory means for storing said game program, said method comprising the steps of:

- storing first character data in an internal memory means coupled to said main game processing means;
- storing second character data, predetermined auxiliary data, and a predetermined value which has a predetermined mathematical relation to said auxiliary data in said removable external memory unit;
- accessing said first character data and said second character data in response to enable signals generated by a memory selecting circuit;
- comparing said first character data with said second character data and generating a first signal if a predetermined relationship exists between said first character data and said second character data;
- displaying said second character data prior to said comparing step determining whether said predetermined relationship exists;
- performing in response to said first signal a predetermined calculation using said auxiliary data;
- comparing the results of said predetermined calculation with said predetermined value;
- providing a predetermined authenticity indicating signal to said memory select circuit to thereby enable said game program to be executed by said game processing means if said first signal is generated and if the results of said predetermined calculation has a predetermined relationship with said predetermined value.

17. A method according to claim 16, further including the step of vertically scrolling said second character data across said display means.

18. A method according to claim 16, further including the step of processing said second character data to permit an enlarged display of said second character data.

19. A method according to claim 16, further including the steps of transferring said second character data from said external memory means to a character memory means, processing said second character data, writing said processed second character data to a video memory means; and displaying said processed second character data.

20. A method according to claim 16, wherein said step of enabling includes the step of switching from one memory bank to another responsive to said results comparison to operatively couple said main game processing means to said external memory unit.

21. A method according to claim 16, wherein said predetermined calculation includes taking the complement of the sum of at least a portion of said auxiliary data.

22. A method according to claim 16, wherein said auxiliary data includes data indicative of the manufacturer and the name of the game.

23. A method according to claim 16, wherein said auxiliary data includes data indicative of the cartridge type and the memory characteristics.

24. A system according to claim 16 wherein said step of comparing said first character data with said second character data includes setting the starting addresses of the first character data and the second character data in registers associated with said main game processing means and incrementing said addresses.

* * * * *